(12) United States Patent
Chin et al.

(10) Patent No.: US 10,285,522 B2
(45) Date of Patent: May 14, 2019

(54) TRAVEL VESSEL FOR BEVERAGES

(71) Applicant: Impel Studio LLC, New York, NY (US)

(72) Inventors: Matt Chin, New York, NY (US); Gareth Brown, Gardiner, NY (US); Stephen Kaes, New York, NY (US)

(73) Assignee: Impel Studio LLC, New York, NY (US)

( * ) Notice: Subject to any disclaimer, the term of this patent is extended or adjusted under 35 U.S.C. 154(b) by 0 days.

(21) Appl. No.: 15/582,097

(22) Filed: Apr. 28, 2017

(65) Prior Publication Data

US 2018/0050845 A1 Feb. 22, 2018

Related U.S. Application Data

(63) Continuation-in-part of application No. 29/591,082, filed on Jan. 17, 2017.
(Continued)

(51) Int. Cl.
*A47G 19/22* (2006.01)
*A47J 41/00* (2006.01)

(52) U.S. Cl.
CPC ...... *A47G 19/2272* (2013.01); *A47J 41/0016* (2013.01)

(58) Field of Classification Search
CPC ........................... B65D 39/12; B65D 39/0023; B65D 39/0005; B65D 39/00; B65D 39/08; B65D 39/14; B65D 53/02; B65D 81/3869; B65D 81/3865; B65D 1/40; B65D 25/48; B65D 47/20; B65D 47/24; B65D 47/241; B65D 47/242; B65D 47/245; B65D 47/246; B65D 47/26; B65D 47/261; B65D 47/263; B65D 43/0229; B65D 43/0227; B65D 43/0225; B65D 41/0407; B65D 41/0435;
(Continued)

(56) References Cited

U.S. PATENT DOCUMENTS 826,226 A * 7/1906 Burton .................. B65D 39/08
215/357
3,021,974 A * 2/1962 Watts ..................... F16J 13/12
220/304
(Continued)

FOREIGN PATENT DOCUMENTS

GB 826948 A * 1/1960 ......... B65D 39/0023

*Primary Examiner* — Robert J Hicks
(74) *Attorney, Agent, or Firm* — Gloria Tsui-Yip, Esq.; Gottlieb, Rackman & Reisman, P.C.

(57) ABSTRACT

A travel vessel has a vessel body and a stopper, which upon engagement, is movable from an open, drinking, position to a closed, sealed position. The vessel body has a top edge that allows drinking along the entire 360° perimeter; below the top edge is a cup-like portion; below the cup-like portion is a gasket engaging portion; and below the gasket engaging portion are internal threads for receiving and engaging the corresponding external threads of stopper. The upper portion of the stopper has a ledge. The lower portion of the stopper is a depending wall extending from the upper portion with a plurality of small holes circumferentially disposed on the depending wall to allow flow of liquid at a certain fixed flow rate. A gasket works cooperatively with the ledge and is compressed against the gasket engaging portion to seal the vessel body.

20 Claims, 16 Drawing Sheets

Related U.S. Application Data

(60) Provisional application No. 62/376,224, filed on Aug. 17, 2016.

(58) Field of Classification Search
CPC .... B65D 41/06; B65D 41/04; A47G 19/2227; A47G 19/2272; A47G 19/2266; A47G 19/2205; A47G 19/2282; A47J 41/0027
USPC ........ 215/356, 355, 360, 358, 364; 220/304, 220/295, 293, 288, 378, 713, 711, 62.18, 220/62.12; 222/563, 568, 567
See application file for complete search history.

(56) References Cited

U.S. PATENT DOCUMENTS

| | | | | |
|---|---|---|---|---|
| 3,062,419 A | * | 11/1962 | Goth | B65D 47/263 222/484 |
| 3,785,539 A | * | 1/1974 | Wetterek | A47J 41/0027 215/329 |
| 4,485,963 A | * | 12/1984 | Panicci | A47G 19/2266 215/229 |
| 4,905,863 A | * | 3/1990 | Blomquist | B65D 51/1683 220/231 |
| 6,102,244 A | * | 8/2000 | Kuwano | A47G 19/2272 220/711 |
| 8,348,078 B2 | * | 1/2013 | Lane | A47G 19/2272 220/203.04 |
| 8,584,877 B2 | | 11/2013 | Heiberger | |
| 8,967,414 B2 | | 3/2015 | Lane | |
| 9,215,942 B2 | | 12/2015 | Bodum | |
| 2002/0125205 A1 | | 9/2002 | Hathaway et al. | |
| 2003/0132231 A1 | | 7/2003 | Van De Klippe | |
| 2010/0133275 A1 | * | 6/2010 | Phillips | B65D 7/40 220/270 |
| 2011/0309094 A1 | * | 12/2011 | Bodum | A47G 19/2272 220/715 |
| 2017/0081090 A1 | * | 3/2017 | Boyer | B65D 47/121 |
| 2017/0121077 A1 | * | 5/2017 | Lawson | A47G 19/2266 |

\* cited by examiner

TRAVEL VESSEL FOR BEVERAGES

This application claims benefit of provisional patent application Ser. No. 62/376,224 filed on Aug. 17, 2016, and is a continuation-in-part of design patent application Ser. No. 29/591,082 filed on Jan. 17, 2017, which are hereby incorporated by reference.

FIELD OF INVENTION

This invention relates to a travel vessel for beverages. In particular, an improved beverage container that provides a proper seal in a closed position and allows an appropriate flow of liquid for drinking from any edge in an open position that is easy to use and clean with minimal parts.

BACKGROUND OF THE INVENTION

Travel mugs or tumblers contain and insulate liquid beverages and allow users to imbibe on the go (e.g. while driving a car, riding on a bus or train, or while walking) with a reduced risk of spillage compared to a regular mug that is open-topped with no cover or top. Existing travel mugs are imperfect, and all have one or more flaws.

Some travel mugs do not create a fully sealed container, and they will leak their contents when inverted or jostled, causing liquid contents to spill out and create a mess or damage other items. Some travel tumblers require liquid to be imbibed through a small aperture in the lid, so the liquid beverage is never exposed to ambient air. This lack of contact with ambient air makes it impossible for the aroma and fragrance of a liquid beverage to reach a user's nasal passages, so their sensory enjoyment of their beverage is substantially limited. Some travel tumblers have a localized drinking aperture (i.e. at a specific location of the tumbler), and do not allow a user to drink from any side of the tumbler. Instead the user must first orient the drinking aperture towards their mouth. Some travel tumblers allow a user to drink from any side of the mug—360° drinking. Those that do allow 360° drinking can dispense too much liquid when tilted, and/or will splash excess liquid in a wide stream that extends beyond the user's mouth, making it difficult to control the flow. This results in splashing of the liquid contents upon the user's lip, face and clothing, which can also pose a safety hazard as the liquid contents are often very hot. As tumblers typically have an opaque body and/or an opaque covered top, the user cannot directly see the level of the liquid inside and it is very easy to over-tip or over-tilt the tumbler and accidentally splash liquid all over one's face.

Some travel tumblers cannot be opened or closed with one hand. Some travel tumblers do not have ergonomic indicators to be able to bring the cup swiftly to your lips without looking down at the tumbler. Some tumblers can obscure your forward vision while drinking, a safety hazard while operating a motor vehicle.

Most of all, many tumblers have design features that are difficult, laborious, or impossible to clean. They feature multiple parts, hidden passages and chambers, inaccessible recesses and other features that can trap and harbor food debris, supporting the growth of potentially harmful molds, yeasts, and bacteria.

Therefore, there is a need for an improved travel vessel that is fully sealed in a closed position and allows drinking from any edge in an open position that is easy to use and clean with minimal parts.

SUMMARY OF THE INVENTION

The present invention is an improved travel vessel (i.e. beverage container) having a vessel body and a stopper. The vessel body has a substantially cylindrical body with an open end. The upper portion of the vessel body may have a generally frusto-conical flare. The top edge of the vessel body at the open end allows drinking along the entire perimeter (360°). Below the top edge is a cup-like portion formed from the inner wall tapering towards the central axis of the vessel to form a radial extending lip. Below the cup-like portion, with further tapering, is a gasket engaging portion with a radial extending rim. Below the gasket engaging portion are internal threads for receiving and engaging the stopper to seal the open end.

The stopper is externally threaded to interact with the internal threads of the vessel body. The upper portion of the stopper has an enlarged, radially extending ledge. The lower portion of the stopper is a depending wall extending from the lower surface of the upper portion. A resilient gasket is carried on the lower portion of the stopper and is compressed to provide a watertight seal between the radially extending ledge and the inner wall of the vessel body. The stopper has a plurality of small holes (or slits) circumferentially disposed on its lower portion to allow flow of liquid at a certain flow rate when the stopper is in an open, drink, position. Upon engaging the stopper with the vessel body, the stopper is rotatable with respect to the vessel body to be either in an open position (i.e. drink position; allows flow of liquid through the small holes) or a closed position (i.e. sealed position; prevents the flow of liquid through the small holes).

In one embodiment of the present invention, the plurality of holes are disposed on the depending wall spaced apart from the lower surface of the upper portion. The outer surface of the wall is tapered around the holes to promote a smooth flow of liquid out of the holes.

In another embodiment of the present invention, the stopper has a plurality of large apertures disposed on the depending wall. The resilient gasket substantially covers the large holes, leaving a small gap, defining the holes that liquid flows through.

In another embodiment of the present invention, the resilient gasket completely covers the large apertures. The gasket has a plurality of small apertures that overlap the large apertures from which liquid flows through.

In another embodiment of the present invention, the stopper has a straw hole for optional use with a straw. The straw hole has a pivotable cover for sealing and resealing of the straw hole.

Extending from the lower edge of the depending wall is at least one tab having an opening (a detent engaging element), which interacts with a corresponding protrusion (a detent element) on the inner wall of the vessel when the stopper is in an open position. Upon rotating the stopper from a closed position to an open position, the opening snaps over and engages the protrusion to indicate the stopper is in an open position. Optionally, on the outer surface of the tab abutting the left and right sides of the opening is a pair of raised ramps. The raised ramps are asymmetrical, i.e. higher ramp on one side, which make it more difficult (but not impossible) for continual rotation of the stopper to completely disengage and remove the stopper from the vessel body. It is less difficult to rotate the stopper for initial insertion into the vessel body for engagement of the stopper with the vessel body.

In another embodiments, the detent engaging element is a pair of raised bars or a cantilever latch provided along the external threading of the stopper such that the pair of raised bars or latch snaps over and engages a corresponding protrusion on the inner wall of the vessel.

The gasket may be made of a highly contrasting coloration to clearly indicate an open position. The color of the gasket reflects against the polished reflective radially extending lip and inner wall of the vessel body to provide visual feedback of the stopper position when the stopper is elevated.

BRIEF DESCRIPTION OF THE DRAWINGS

Preferred embodiments of the present invention have been chosen for purposes of illustration and description and are shown in the accompanying drawings, which are not necessarily to scale, forming a part of the specification wherein.

DETAILED DESCRIPTION OF THE PREFERRED EMBODIMENTS

Figure 1:
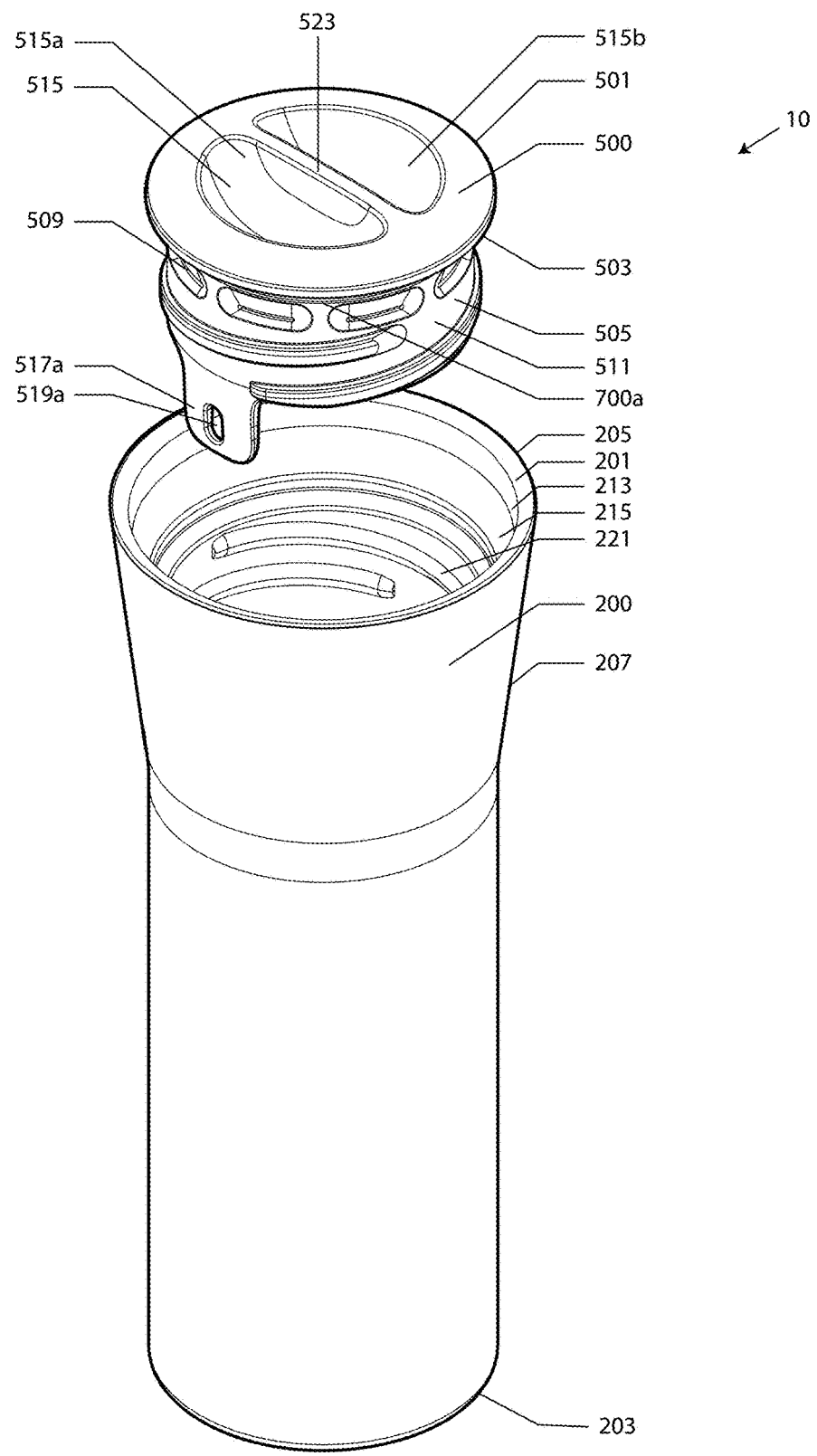
FIG. 1 is an exploded perspective view of the travel vessel of the present invention, with the stopper completely separated from the vessel body.

With reference to the drawings, wherein the same reference number indicates the same element throughout, there is shown in FIG. 1 an improved travel vessel 10 for liquid or a beverage of the present invention. The travel vessel (or beverage container) 10 of the present invention includes a vessel body 200 and a stopper 500. The stopper 500 is removably insertable into and engages the vessel body 200. References to positions and directions such as upper, lower, top, below, left, right, up, down, etc. are directed to the travel vessel 10 and its parts when they are in a typical at rest, vertically aligned, position of a beverage container, as illustrated in FIG. 1.

Figure 2:
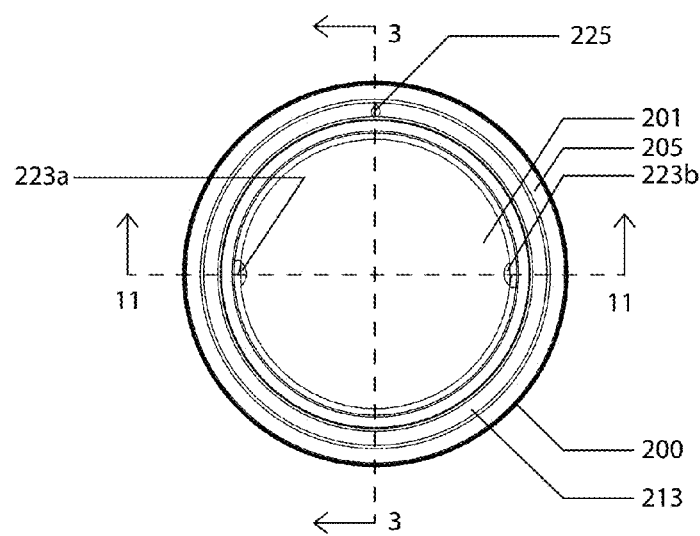
FIG. 2 is a top plan view of the vessel body.
Figure 3:
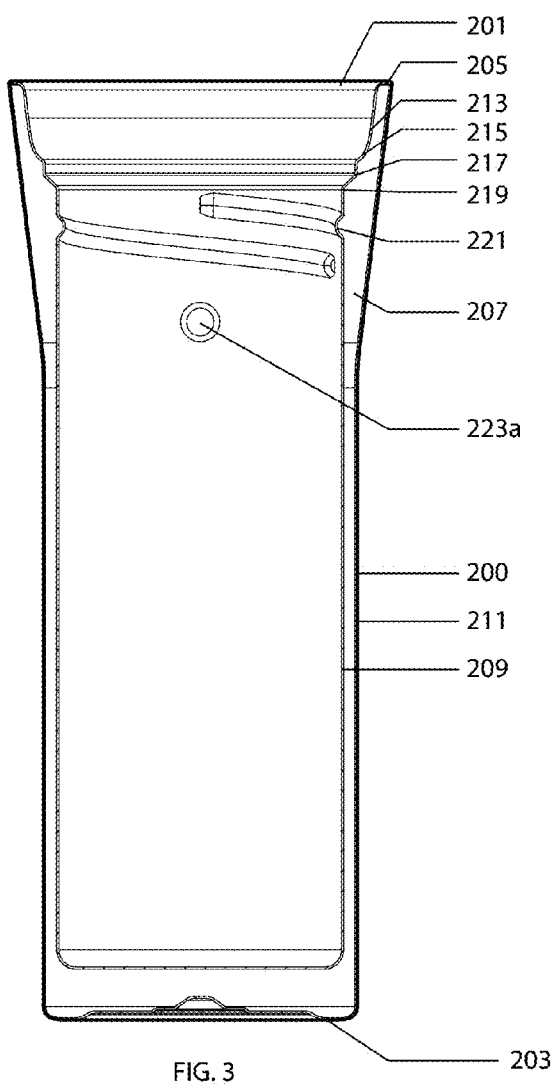
FIG. 3 is a cross-sectional view of FIG. 2 taken along line 3-3.
Figure 4:
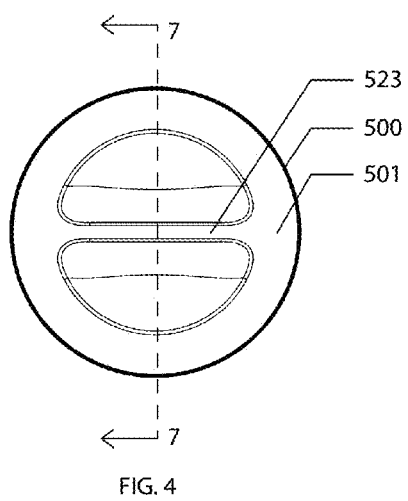
FIG. 4 is a top plan view of the stopper.
Figure 5:
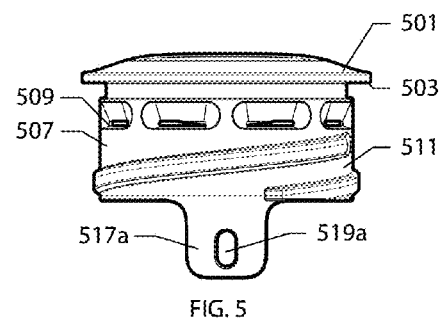
FIG. 5 is the front elevational view of the stopper.
Figure 6:
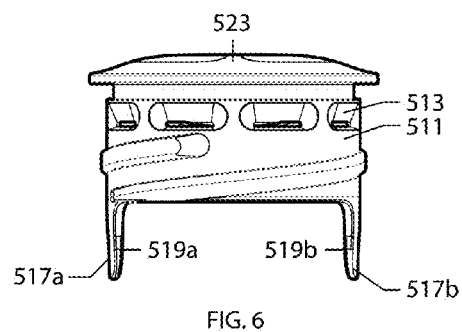
FIG. 6 is the left or right side view of the stopper.
Figure 7:
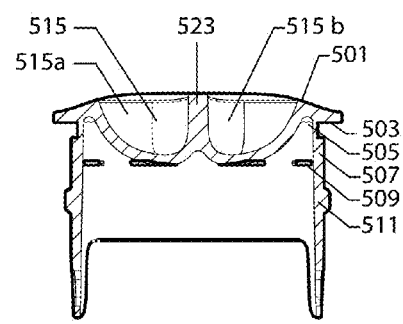
FIG. 7 is a cross-sectional view of FIG. 4 taken along line 7-7.

As shown in FIGS. 1-3, the vessel body 200 is a substantially cylindrical container of rigid material with one open end 201 at the top and a closed end 203 at the bottom to hold liquid or a beverage for dispensing at the open end 201. The upper portion of the vessel body 200 may have a generally frusto-conical flare 207 such that when a user grips the vessel body 200, the user has a tactile clue for locating the top edge 205 of the vessel body 200 to his/her lips without having to look down at the travel vessel 10. The vessel body 200 is double-walled, with the space between the inner wall 209 and outer wall 211 being evacuated of air for increased insulative properties. The top edge 205 of the vessel body 200 is tapered at the open end 201 to allow comfortable drinking along the entire 360° perimeter of the top edge 205.

Below the top edge 205 is a cup-like portion 213 formed from the inner wall 209 tapering towards the central axis of the vessel body 200 with a radial extending lip 215. Below the cup-like portion 213 formed from further tapering of the inner wall 209 is a gasket engaging portion 217 with a radial extending rim 219. Below the gasket engaging portion 217 are internal threads 221 for engaging with the stopper 500 to seal the open end 201. Below or at the internal threads 221 is a pair of detent elements on the inner wall 209, shown as semi-hemispherical protrusions 223a and 223b in FIGS. 2 and 3. While two detent elements are shown in the figures, there can be more or less than two detent elements.

The vessel body 200 is made of a rigid material, such as stainless steel, plastics, etc. While the vessel body 200 as shown does not have a handle, it may have one or more handles. The vessel body 200 can be single walled instead of double-walled. The vessel body 200 can be completely cylindrical or have other different outer shapes as known to one skilled in the art (e.g. with concave and/or convex curvatures, frusto-conical, octagon, non-uniform, etc.). The surface of the outer wall 211 of the vessel body 200 may have other elements thereon as known to one skilled in the art to provide a tactile clue for locating the top edge 205 of the vessel 10 (e.g. surface treatment, protrusion, depression, etc.).

As shown in FIGS. 1 and 4-7, the upper portion 501 of the stopper 500 has an enlarged, radially extending ledge 503. The lower portion of the stopper 500 is a tubular depending wall 507 extending downwardly from the lower surface 505 of the radially extending ledge 503. A plurality of through holes (or slits) 509 are circumferentially disposed on the depending wall 507 spaced apart from, and below, the lower surface 505 of the radially extending ledge 503. Below the plurality of holes 509 are external threads 511 on the depending wall 507 for engaging the vessel body 200 to seal the open end 201.

The upper portion 501 of the stopper 500 is concaved with a rib 523 spanning diametrically across the concave area 515 dividing the concave area 515 into two cavities 515a and 515b for receiving a user's digits to grip the rib 523. A resilient gasket 700a is carried on the stopper 500 at the junction where the tubular depending wall 507 extends from the lower surface 505 of the radially extending ledge 503.

The plurality of holes 509 allow the flow of liquid at a certain flow rate when the stopper is in an open, drink, position. Preferably, the flow rate of the liquid through the holes 509 is 30-40 mL per second. The outer surface of the depending wall 507 is tapered around and towards the holes 509 to promote an easy and smooth flow of liquid out of the holes 509. As a result of the tapered area 513 around each hole 509, the thickness of the depending wall 507 at the hole 509 is thin, which facilitates the cleaning and rinsing of and around the hole 509. The tapered area 513 is shown to be non-uniform around the hole 509, i.e. slower tapering (with lower gradient) above the hole 509, faster, more abrupt, tapering (with higher gradient) below the hole 509, and in-between tapering (between the lower and higher gradients) on the left and right sides of the hole 509. However, the tapered area 513 may be uniform, i.e. equal gradient around the hole 509, with different variations of gradients from those as shown, or just tapered above and below the hole 509. The tapered area 513 above the hole 509 forms an inclined plane to ease the flow of liquid when a user tilts the vessel 10 for drinking.

Figure 8:
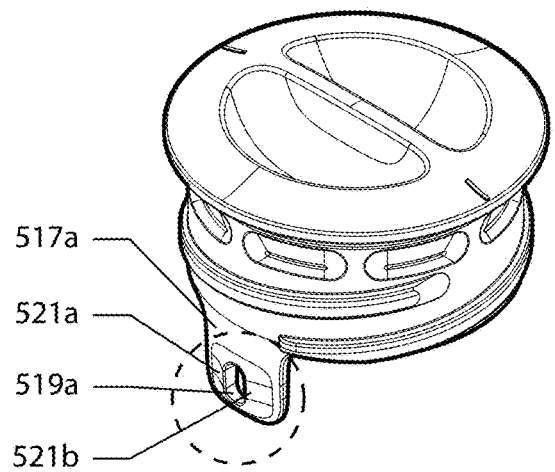
FIG. 8 is a perspective view of the stopper with a pair of raised ramps on the tab.
Figure 8A:
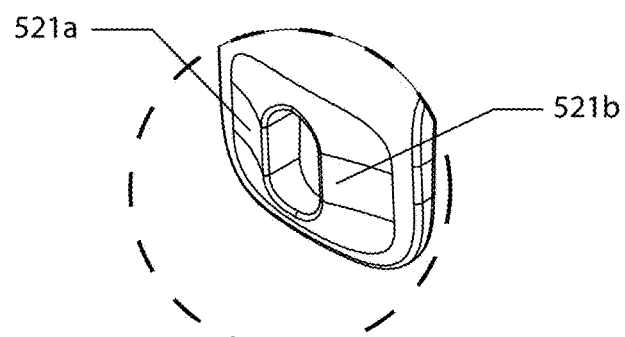
FIG. 8A is a magnified detail of a portion of the ramp.
Figure 8B:
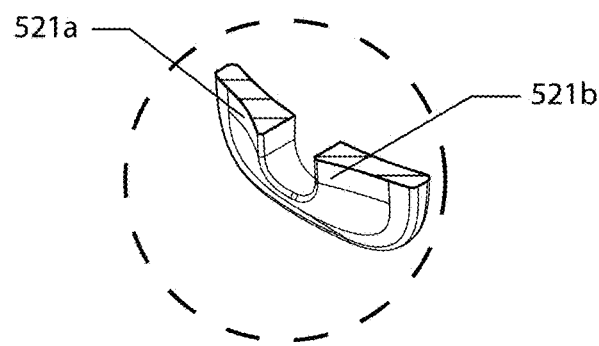
FIG. 8B is a cross-sectional view of FIG. 8A.

Extending downwardly from the lower edge of the depending wall 507 is a pair of diametrically disposed tabs 517a and 517b. The diametric axis of the tabs 517a and 517b is perpendicular to the diametric axis of the rib 523. A through opening 519a and 519b is disposed on each tab 517a and 517b. The through opening 519a and 519b acts as a detent engaging element that interact with a corresponding detent element, the semi-hemispherical protrusion 223a and 223b on the inner wall 209, when the stopper 500 is in an open position. Optionally, FIGS. 8, 8A and 8B show the tab 517a or 517b having a pair of raised ramps 521a and 521b on the outer surface of the tab 517a or 517b abutting the opening 519a or 519b. The pair of raised ramps 521a and 521b are asymmetrical in height, with a high ramp 521a on the left side of the through opening 519a and a low ramp 521b on the right side of the through opening 519b. Each of the ramps, the high ramp 521a and the low ramp 521b, has its taller end of the ramp abutting the opening 519a. Although the figures show a pair of tabs 517a and 517b, there can be more or less tabs.

Figure 9:
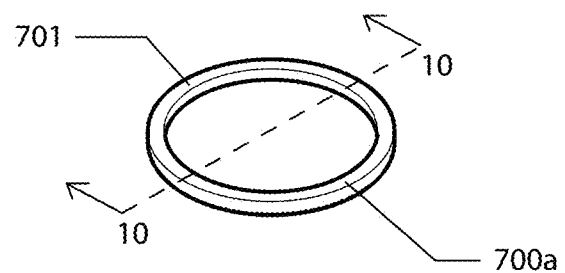
FIG. 9 is a perspective view of the gasket.
Figure 10:
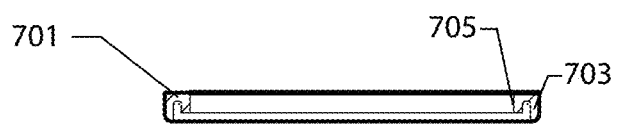
FIG. 10 is a cross-sectional view of FIG. 9 taken along line 10-10.

As shown in FIGS. 9-10, one embodiment of the resilient gasket is gasket 700a, which has a ring shaped body 701 with two depending lips 703 and 705 that are concentrically arranged. The outer depending lip 703 with a larger diameter extends further from the ring shaped body 701 (i.e. taller in height) than the inner depending lip 705 with a smaller diameter. The gasket 700a is made of a resilient or elastomeric material (such as silicone rubber or other material known to one skilled in the art for gaskets). Gasket 700a is frictionally positioned on the stopper 500 as shown in FIGS. 11-13, with the ring shaped body 701 abutting the lower surface 505 of the upper portion 501 of the stopper 500 and the inner depending lip 705 abutting and surrounding the depending wall 507 of the lower portion of the stopper 500.

The stopper 500 is made of a rigid material, such as Tritan™ available from Eastman Chemical Company of Kingsport, Tenn., polycarbonate, plastic, etc. The plurality of holes 509 are shown in the figures to be evenly distributed circumferentially on the depending wall 507, but can also be distributed unevenly, so long as the holes 509 are all leveled and horizontally aligned.

Figure 11:
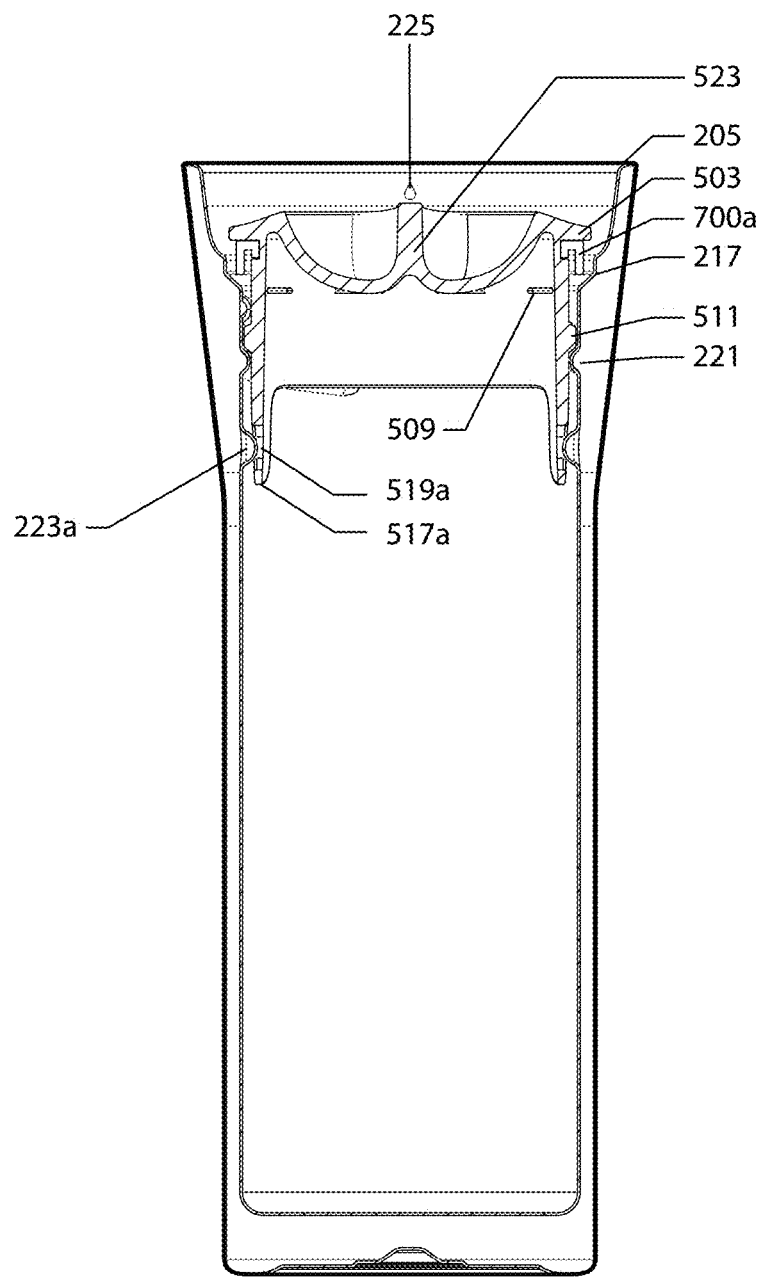
FIG. 11 is a cross-sectional view of FIG. 2 taken along line 11-11 with the stopper in an open position.
Figure 12:
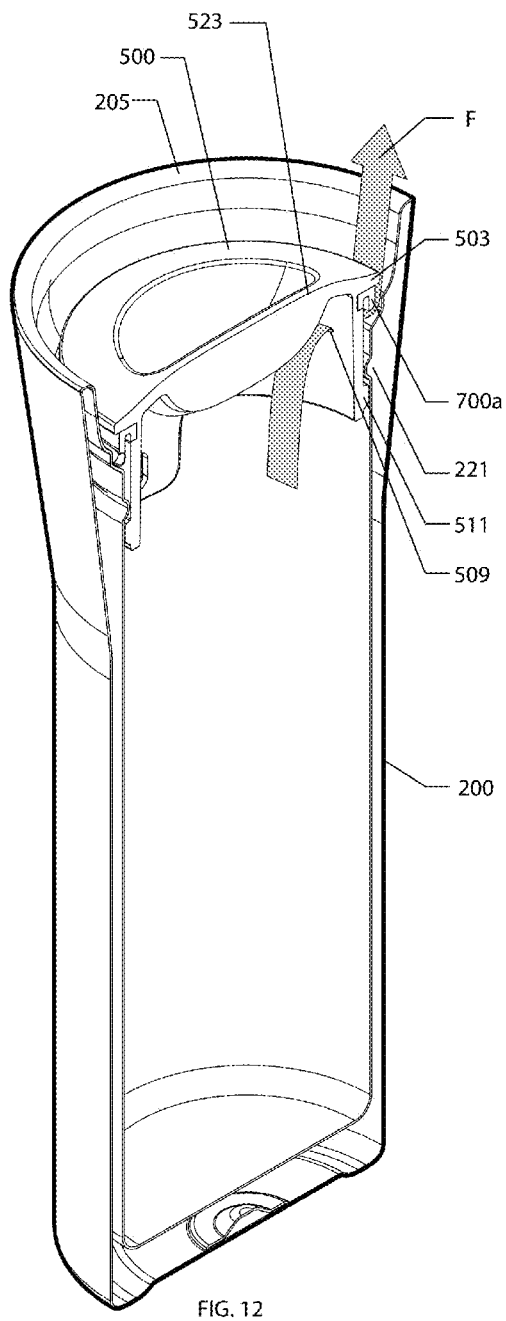
FIG. 12 is a perspective view of FIG. 11.
Figure 13:
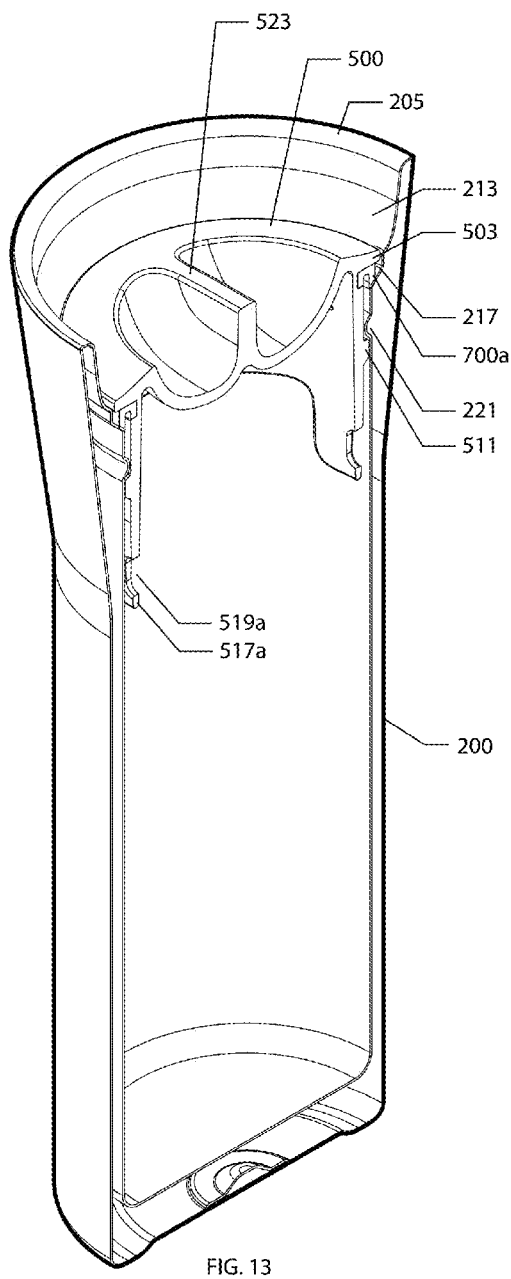
FIG. 13 is a perspective cross-sectional view similar to FIG. 12, with the stopper in a closed position.

The use of the travel vessel 10 is simple and easy, with the stopper 500 easily removable and insertable into and engageable into the vessel body 200, as shown in FIGS. 11-13. After the vessel body 200 is filled with the desired liquid or beverage, the stopper 500 is insert through the open end 201 of the vessel body 200 such that the external threads 511 of the stopper 500 engages and interacts with the internal threads 221 of the vessel body 200. The user may position his thumb and index finger (or other digits) in the two cavities 515a and 515b, respectively, to grip the rib 523 to rotate the stopper 500. By rotating the stopper 500 in a clockwise direction, the stopper 500 is lowered into the vessel body 200. The stopper 500 is in the open position when the opening 519a of the stopper 500 engages the protrusion 223a of the vessel body 200 (interaction of corresponding opening 519b, protrusion 223b, tab 517b, etc. are identical and is not separately described below). To position the stopper 500 in such an open position, sufficient force is required to rotate the stopper 500 such that the protrusion 223a can ride over the high ramp 521a to rest within the opening 519a. The tab 517a flexes slightly when the protrusion 223a goes over the high ramp 521a. Tactile and/or audio feedback from the snapping action between the opening 519a and protrusion 223a is provided to the user to signal the appropriate positioning of the stopper 500 in the vessel body 200 in the open position. Additional indicia or marking 225, such as a water drop symbol, may be provided on the cup-like portion 213 of the vessel body 200 to indicate the open position. When the rib 523 is in alignment with the indicia 225, it indicates the stopper 500 is in the open position. Once the stopper 500 is in an open position, it does not easily rotate to a closed position or become disengaged due to the presence of the pair of ramps 521a and 521b. To position the stopper 500 into a closed position, the user can continue to rotate the stopper 500 in a clockwise direction. Some force is required for the protrusion 223a to hop over the taller end of the low ramp 521a. Once the protrusion 223a disengages the opening 519a, the stopper 500 is rotated until the gasket 700a interacts with the gasket engaging portion 217, with the enlarged, radially extending ledge 503 compressing the gasket 700a (specifically, the outer depending lip 703) against the gasket engaging portion 217 to create a watertight seal to the open end 201 of the vessel body 200. It takes about a quarter-turn rotation of the stopper 500 to move from an open position to a closed position. The stopper 500 is sized to fit entirely below the top edge 205 of the vessel body 200 and recessed into the vessel body 200 when the stopper 500 is in either the open or closed positions. This minimizes the risk of the stopper 500 being accidentally unscrewed (or rotated or disengaged) with respect to the vessel body 200 while in transit, even if the vessel 10 is inside a bag with other loose items.

To reverse the steps with the stopper 500 initially in a closed position, the user rotates the stopper 500 counterclockwise to elevate the stopper 500 with respect to the vessel body 200. Once the protrusion 223a rides over the low ramp 521b, with relative ease, and is positioned in opening 519a, the stopper 500 is in the open position. The tab 517a flexes slightly when the protrusion 223a goes over the low ramp 521b and provides the user with tactile and/or audio feedback from the snapping action between the opening 519a and protrusion 223a to signal the appropriate positioning of the stopper 500 in the vessel body 200. Once the through opening 519a engages protrusion 223a, it is more difficult to continue rotation of the stopper 500 counterclockwise for complete disengagement and removal of the stopper 500 from the vessel body 200 due to the taller end of the high ramp 521a abutting opening 519a. Adequate rotational force is required for the protrusion 223a to hop over the taller end of the high ramp 521a, even with the slight flexing of tab 517a, to completely disengage and remove the stopper 500 from the vessel body 200. This prevents accidental over-rotation of the stopper 500 from the open position, which would otherwise result in the uncontrolled dispensing of liquid from the open end 201 of the vessel body 200.

The stopper 500 is rotatable with respect to the vessel body 200 to be either in an open position (i.e. drink position; allows flow of liquid through the small holes 509) or a closed position (i.e. sealed position; prevents the flow of liquid through the small holes 509). There is no variable control on the flow of liquid from the rotation of the stopper 500 from the open position to the closed position. When the stopper 500 is in an open position, the gasket 700a disengages from the gasket engaging portion 217 and upon tilting the vessel 10, liquid can flow from the vessel body 200 through one or more holes 509 towards the cup-like portion 213 (illustrated in FIG. 12 as arrow F) to the top edge 205, from which a user can imbibe. The cup-like portion 213 allows the liquid to collect to permeate its aroma into the ambient air while the user imbibes. The space between the stopper 500 and the vessel body 200 adjacent the holes 509 does not regulate the flow of liquid, but is larger than necessary such that the dispensed liquid from the holes 509 forms a thin stream so as not to spill over a user's face when the vessel 10 is tilted when drinking. The circumferentially disposed holes 509 allow air to enter the vessel body 200 through some of the holes 509 (acting as air vent holes to replace dispensed liquid) while liquid can flow out smoothly out of other holes 509, and allow a user to drink from all 360° around the top edge 205. The holes 509 are positioned to be spaced apart from the lower surface 505 of the radially extending ledge 503 such that even when the vessel 10 is abruptly tilted, the momentum from the flow of the liquid does not cause the liquid to exit immediately and possibly splash onto the user's face, but instead would first hit the lower surface 505 before flowing out of the holes 509 in a more gentle manner. The ease of the flow of liquid from the hole 509 is further guided by the inclined plane formed at the tapered area 513 around each hole 509.

Figure 14:
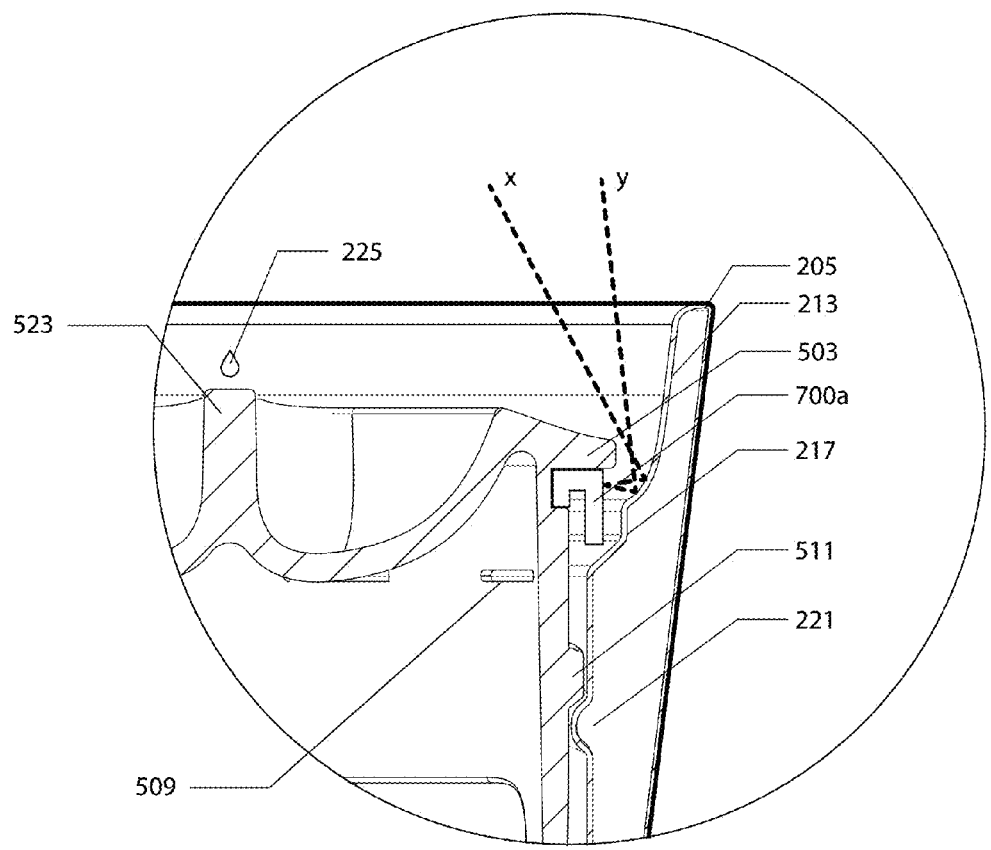
FIG. 14 is a magnified detail of the stopper in an open position to illustrate the reflection from the gasket.
Figure 15:
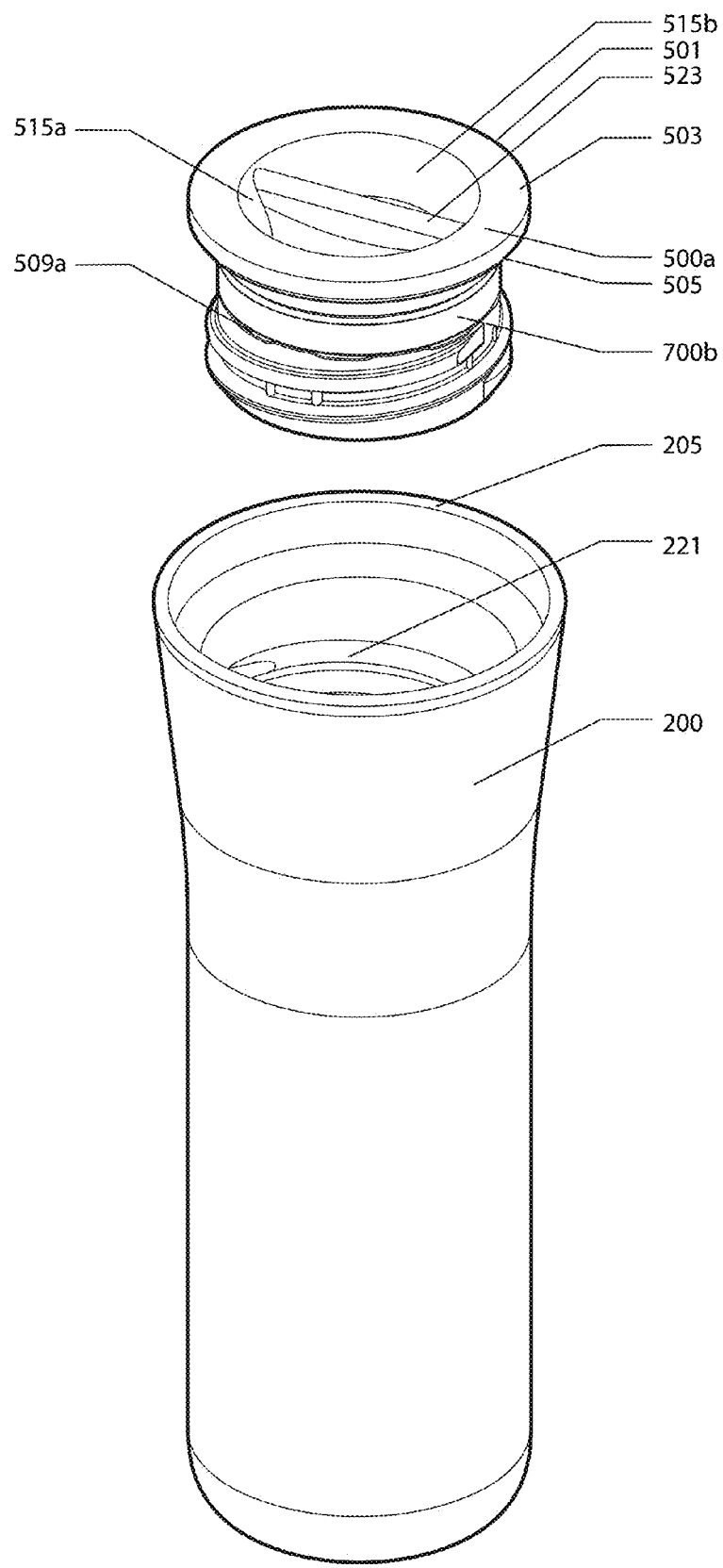
FIG. 15 is an exploded perspective view of a travel vessel of the present invention, with a second embodiment of the stopper completely separated from the vessel body.
Figure 16:
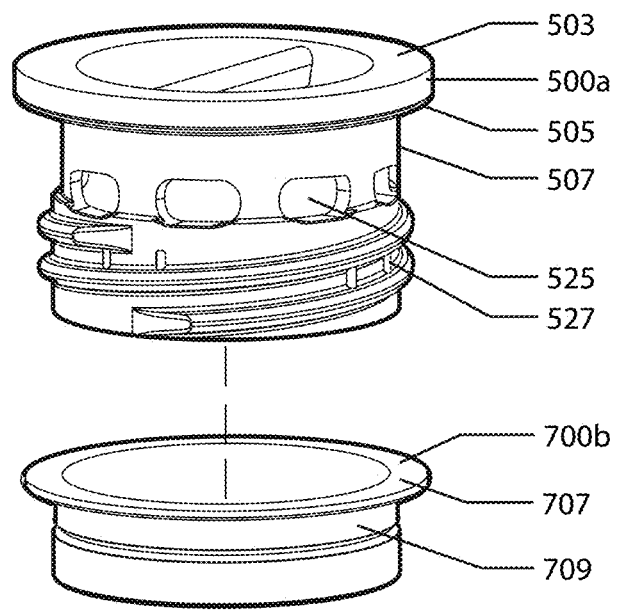
FIG. 16 is an exploded perspective view of a second embodiment of the stopper, with the gasket completely separated from the stopper.
Figure 17:
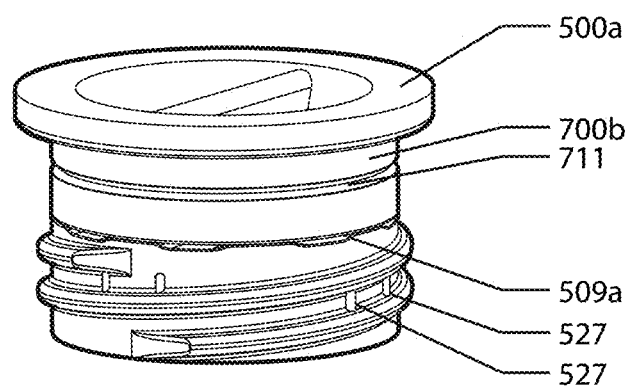
FIG. 17 is a perspective view of the second embodiment of the stopper.
Figure 18:
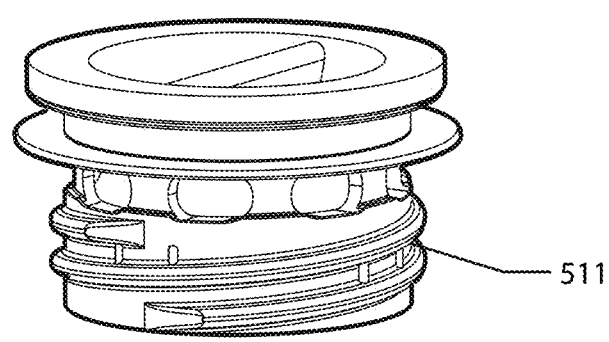
FIG. 18 is the same view as FIG. 16, with the gasket on the stopper and a portion of the gasket folded up.

As shown in FIG. 14, a highly contrasting color gasket 700a can be used to provide additional visual feedback to the user that the stopper 500 is in an open, drink, position. When the stopper 500 is in an elevated, open position, color from the gasket 700a reflects off the cup-like portion 213, as illustrated by rays x and y. The cup-like portion 213 may be highly reflective, such as polished stainless steel, to provide a mirror effect. It is visually apparent and a user can easily notice the coloration on the cup-like portion 213 to know the stopper 500 is in an open position by looking at the vessel 10. On the other hand, when the stopper 500 is in a closed position, the enlarged, radially extending ledge 503 compresses the gasket 700a against the gasket engaging portion 217, the gasket 700a is visually concealed and the color of the gasket 700a can no longer reflects off the cup-like portion 213. A user can easily notice the lack of color and therefore, the closed position of the stopper 500.

FIGS. 15-18 show a second embodiment of the stopper 500a, which is similar to the stopper 500, except that instead of having a plurality of holes (or slits) 509 on the depending wall 507 that allow a certain flow rate, the holes (or slits) 509a are defined by a plurality of large apertures 525 that are substantially covered by gasket 700b. The upper portion 501 of the stopper 500a has an enlarged, radially extending ledge 503. The lower portion of the stopper 500a is a tubular depending wall 507 extending downwardly from the lower surface 505 of the radially extending ledge 503. A plurality of large apertures 525 are circumferentially disposed on the depending wall 507 spaced apart from, and below, the lower surface 505 of the radially extending ledge 503. Below the plurality of large apertures 525 are external threads 511 on the depending wall 507 for engaging the vessel body 200 to seal the open end 201.

Resilient gasket 700b is carried on the stopper 500a at the junction where the tubular depending wall 507 extends from the lower surface 505 of the radially extending ledge 503. Gasket 700b has a ring shaped flange 707 with an annular wall 709 extending therefrom. The gasket 700b optionally has an annular groove 711 on the annular wall 709. When the gasket 700b is frictionally positioned over the stopper 500a, the ring shaped flange 707 abuts the lower surface 505 of the radially extending ledge 503 and the annular wall 709 abuts and surrounds the depending wall 507. The annular wall 709 substantially covers the large apertures 525 of the stopper 500a, leaving a small gap, forming the holes (or slits) 509a from which liquid flows through at a certain flow rate (such as 30-40 mL per second). The use of large apertures 525 in cooperation with the gasket annular wall 709 allow easy access of the large apertures 525 with cleaning tools and access to all surfaces for thorough cleaning or rinsing. Due to the flexible and resilient aspect of the gasket 700b, the annular wall 709 would flex and move under the force of a stream of water during cleaning or rinsing, exposing the large apertures 525. The annular groove 711 also allows the lower part of the annular wall 709 to be folded or lifted up to easily access the large aperture 525 when cleaning or rinsing. There is no obscured, hidden passages or other features or assemblages that prevent a thorough cleaning or rinsing of all surfaces and parts of the stopper 500b and vessel body 200.

An alternative to the tab 517a with through opening 519a as the detent engaging element of stopper 500 is at least a pair of raised bars 527 along the external threads 511 on stopper 500a. Two or more pairs of raised bars 527 can be used. Corresponding detent element, such as a semi-hemispherical protrusion 223a on the inner wall 209 of the vessel body 200, interacts with the pair of raised bars 527 when the stopper 500 is in an open position. The position of the semi-hemispherical protrusion 223a on the inner wall 209 of the vessel body 200 for use with stopper 500a is closer to the top edge 205 than they would be for use with stopper 500 because the pair of raised bars 527 are positioned along the external threads 511 instead of below the external threads 511 as for the through opening 519a.

The use of the stopper 500a with vessel body 200 is similar to that for stopper 500. After filling the vessel body 200 with liquid or a beverage, the stopper 500a is rotated in a clockwise direction, lowering the stopper 500a into and engaging the vessel body 200. The stopper 500a is in the open position when the protrusion 223a is positioned between the pair of raised bars 527. To position the stopper 500a in such an open position, sufficient force is required to rotate the stopper 500a such that the protrusion 223a can ride over one of the raised bars 527. Tactile and/or audio feedback is provided from the protrusion 223a riding over the raised bars 527 to signal the appropriate positioning of the stopper 500a in the vessel body 200 in the open position. To position the stopper 500a into a closed position, the user can continue to rotate the stopper 500a in a clockwise direction. Some force is required for the protrusion 223a to ride over the other one of the raised bars 527. Once the protrusion 223a disengages and moves from between the pair of raised bars 527, the stopper 500a is rotated until the gasket 700b interacts with the gasket engaging portion 217, with the enlarged, radially extending ledge 503 compressing the flange 707 of the gasket 700b against the gasket engaging portion 217 to create a watertight seal to the open end 201 of the vessel body 200. The reversed steps with the stopper 500a from a closed position to an open position is similar to that for stopper 500 and is simply a reversal of the steps from an open position to a closed position described above.

Figure 19:
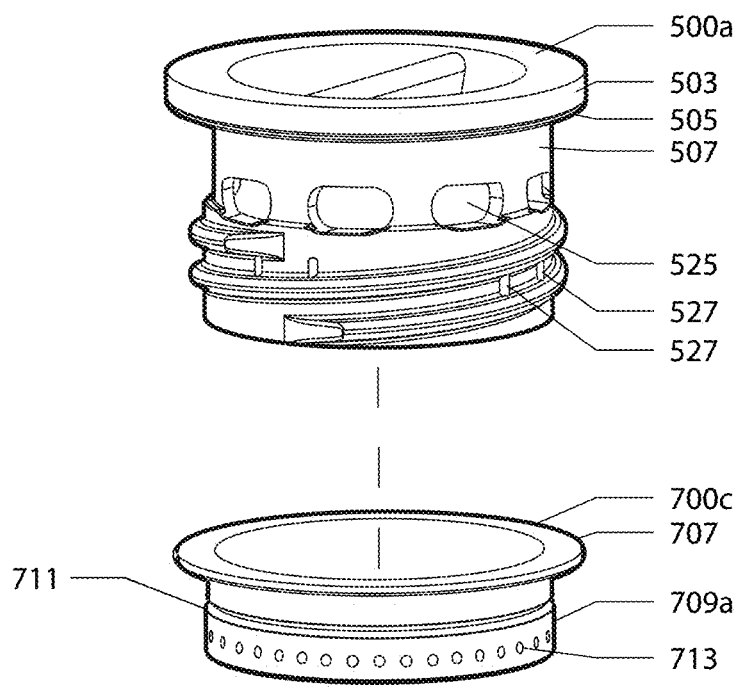
FIG. 19 is an exploded perspective view of the second embodiment of the stopper, with another embodiment of the gasket completely separated from the stopper.
Figure 20:
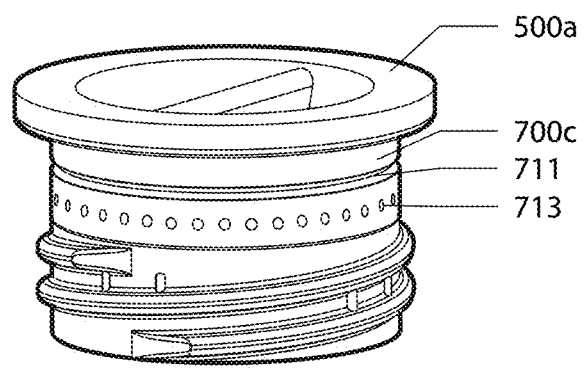
FIG. 20 is a perspective view of FIG. 19 with the gasket on the stopper.
Figure 21:
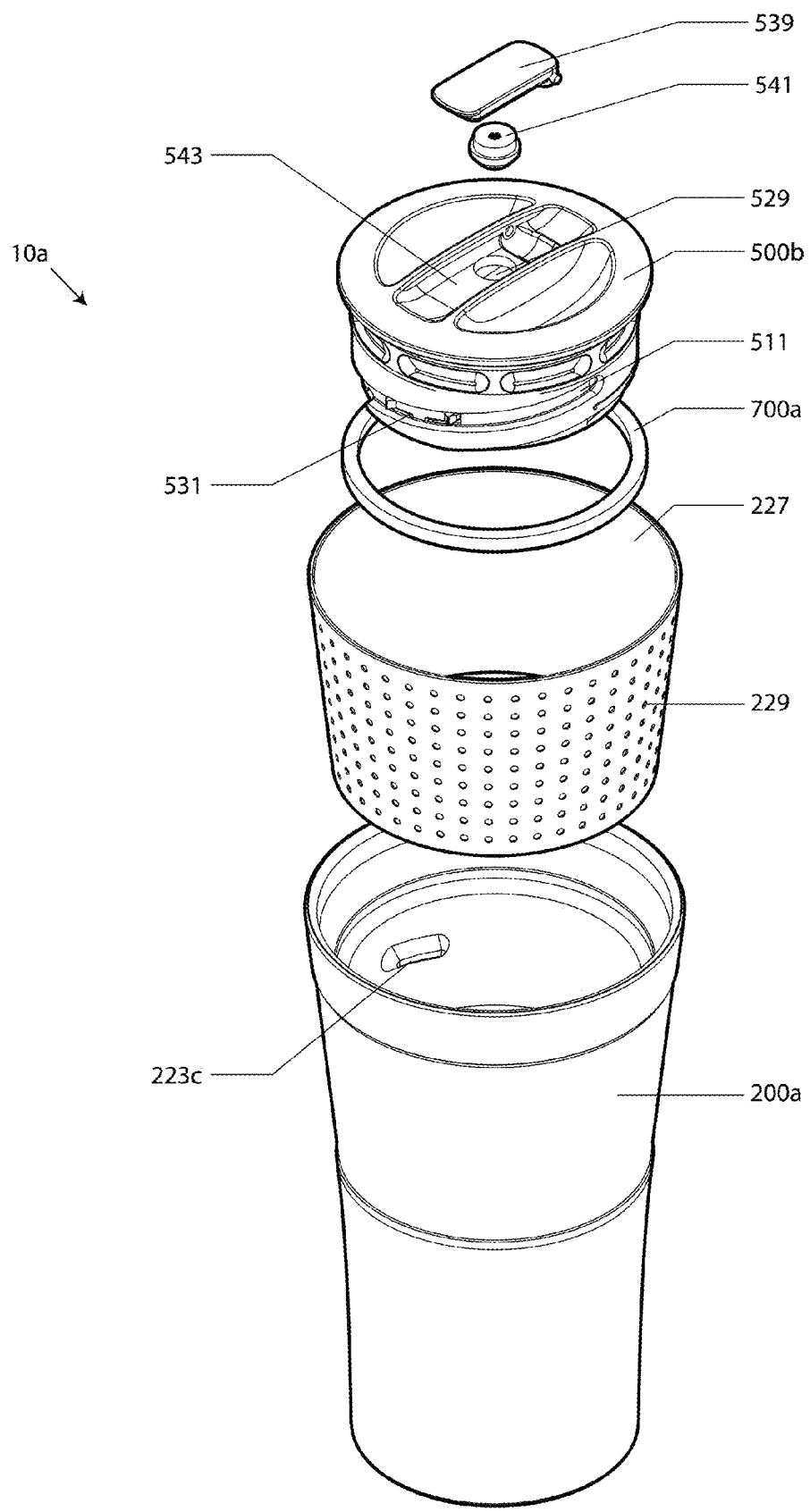
FIG. 21 is an exploded perspective view of a travel vessel of the present invention, with a third embodiment of the stopper with a straw hole completely separated from the vessel body.
Figure 22:
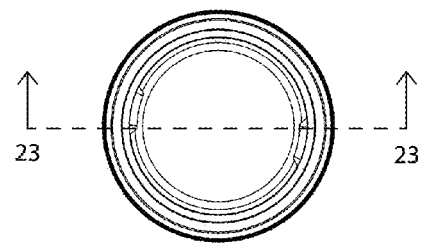
FIG. 22 is a top plan view of the vessel body of FIG. 21.
Figure 23:
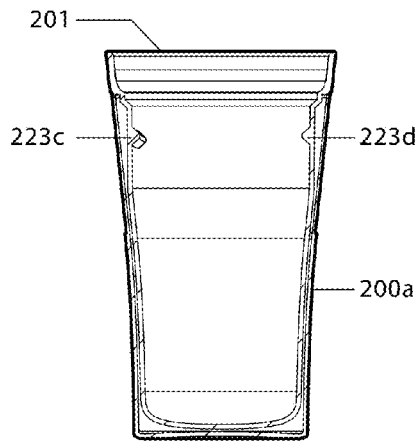
FIG. 23 is a cross-sectional view of FIG. 22 taken along line 23-23.
Figure 25:
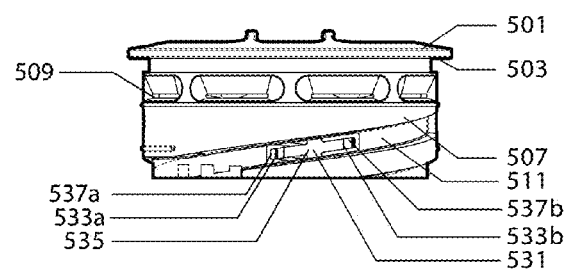
FIG. 25 is the front elevational view of FIG. 24.
Figure 24:
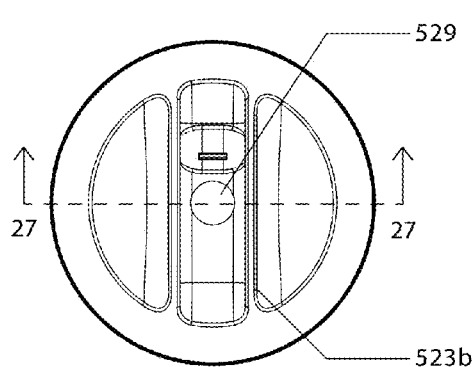
FIG. 24 is a top plan view of the third embodiment of the stopper without the straw hole cover.
Figure 26:
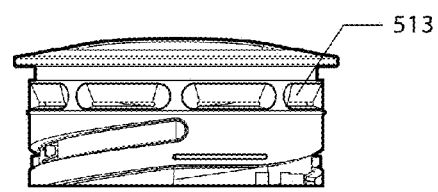
FIG. 26 is the left or right side view of FIG. 24.
Figure 27:
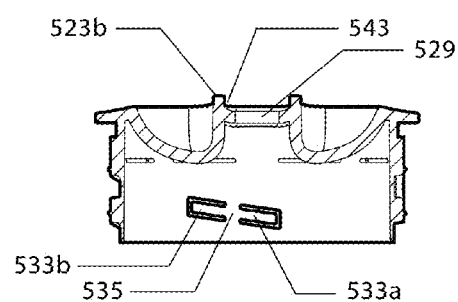
FIG. 27 is a cross-sectional view of FIG. 24 taken along line 27-27.
Figure 28:
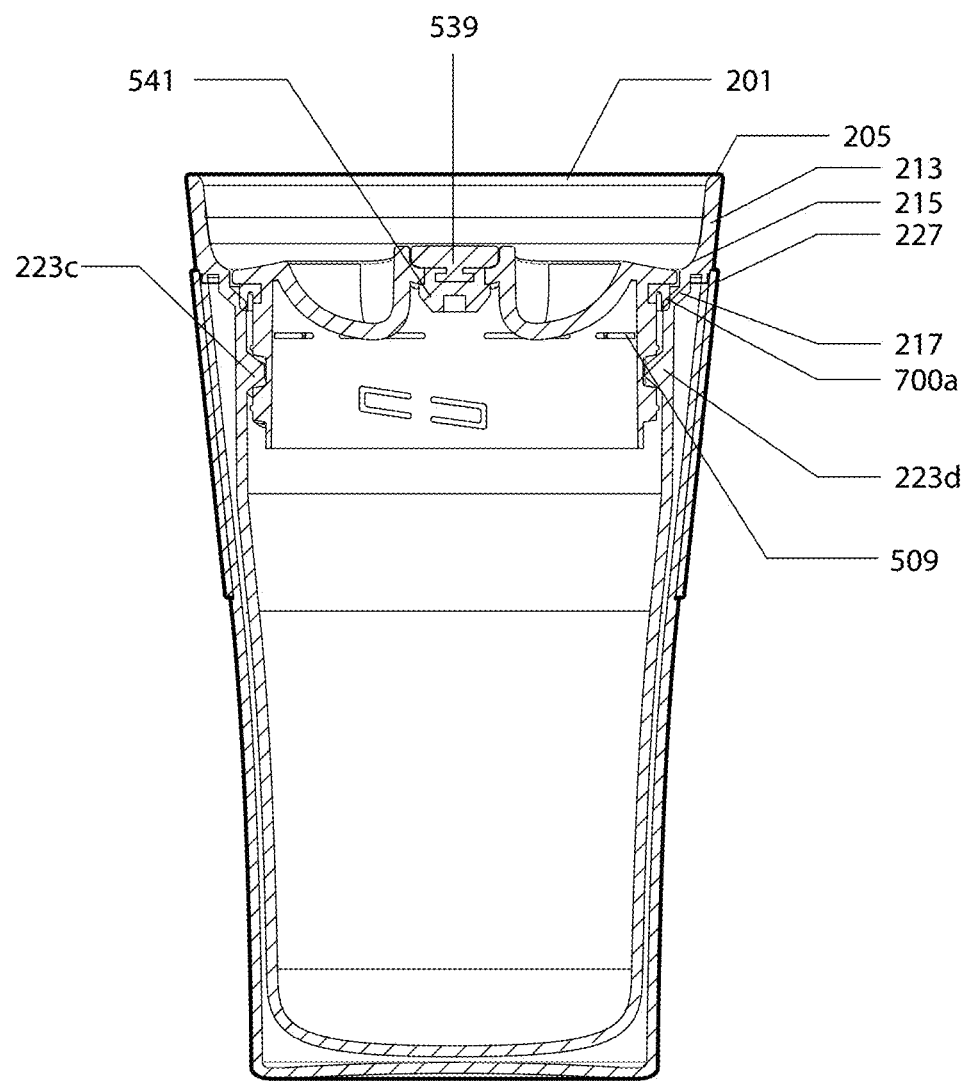
FIG. 28 is the cross-sectional view of FIG. 23 with the third embodiment of the stopper in a closed position.
Figure 29:
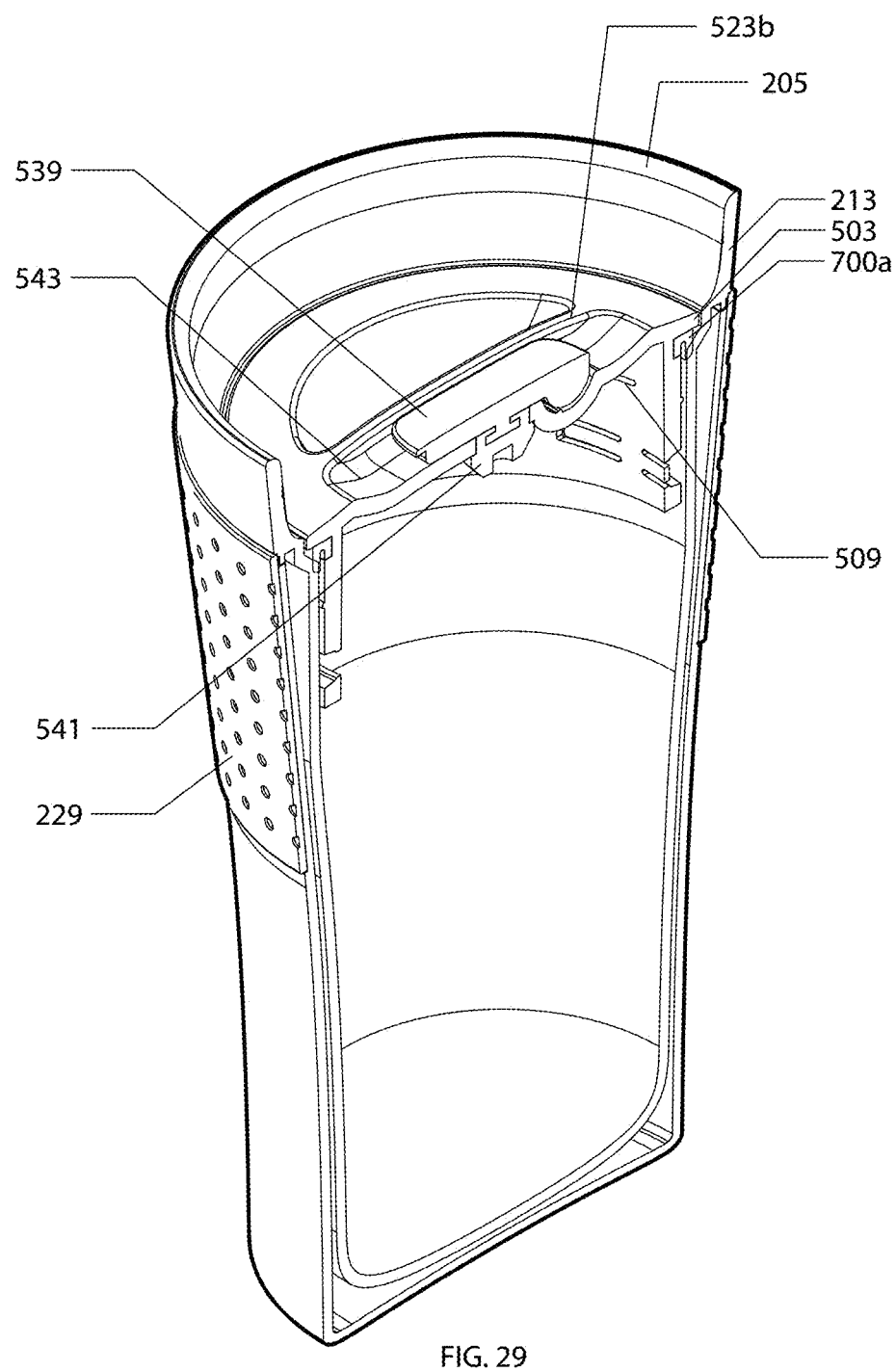
FIG. 29 is a perspective view of FIG. 28.
Figure 30:
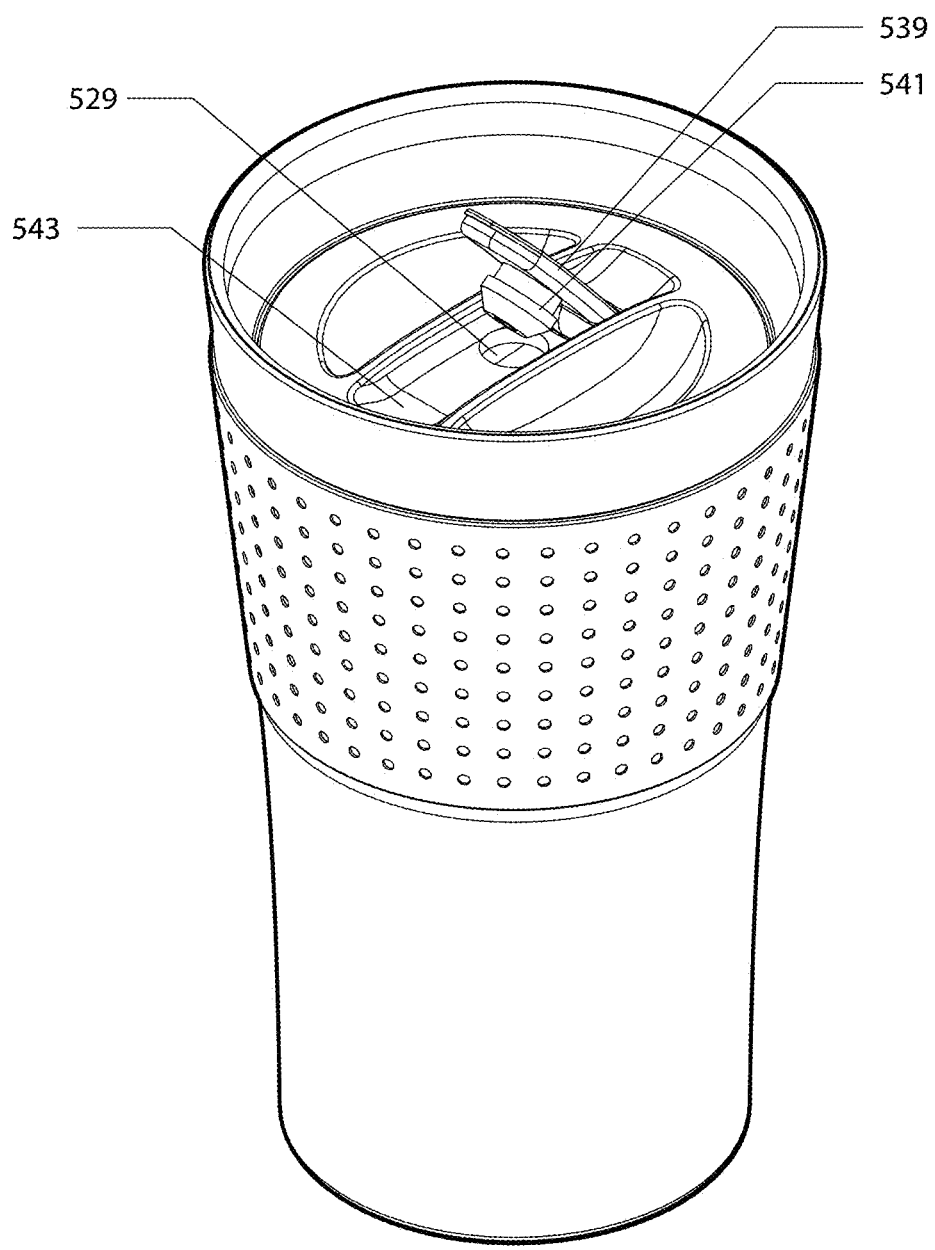
FIG. 30 shows the straw hole cover of the third embodiment of the stopper in a partially open position.

FIGS. 19-20 show an alternative resilient gasket 700c that can be used with stopper 500a. Gasket 700c is carried on the stopper 500a at the junction where the tubular depending wall 507 extends from the lower surface 505 of the radially extending ledge 503. Similar to gasket 700b, gasket 700c has a ring shaped flange 707 with an annular wall 709a extending therefrom, and an annular groove 711 on the annular wall 709a. When the gasket 700c is frictionally positioned over the stopper 500a, the ring shaped flange 707 abuts the lower surface 505 of the radially extending ledge 503 and the annular wall 709a abuts and surrounds the depending wall 507. The annular wall 709a extends further than annular wall 709 from the ring shaped flange 707 such that the annular wall 709a completely covers large apertures 525 of stopper 500a. A plurality of small flow-regulating apertures 713 are positioned radially around the annular wall 709a and overlap the large apertures 525 from which liquid can flow through. The small apertures 713 allow the liquid to flow through at a certain flow rate (such as 30-40 mL per second). The use of large apertures 525 in cooperation with the small apertures 713 on the annular wall 709a allows easy access of the large apertures 525 with cleaning tools and access to all surfaces for thorough cleaning or rinsing. Due to the flexible and resilient aspect of the gasket 700c, the annular wall 709a would flex and move under the force of a stream of water during cleaning or rinsing, exposing the large apertures 525. Further, the small apertures 713 formed on the resilient gasket 700c makes it easier to clean than holes in a rigid material because the annular wall 709a may be deformed while being cleaned or rinsed to access the small apertures 713 and to dislodge and remove any hardened or blocked debris in or around the small apertures 713. The annular groove 711 also allows the lower part of the annular wall 709a to be folded or lifted up to easily access the large aperture 525 when cleaning or rinsing.

FIGS. 21-30 show a travel vessel 10a with a third embodiment of the stopper 500b and a vessel body 200a. The vessel body 200a is substantially similar to vessel body 200 except the vessel body 200a has a tapered outer shape from top to bottom with a sleeve 227 over the mid-section of the vessel body 200a. Sleeve 227 has a plurality of dimples 229 to improve grip by a user and provide tactile clue for locating the top edge 205 of the vessel 10a. Sleeve 227 may be made of the same or different material as the vessel body 200a, and may be made of a resilient material. On the inner wall 209 of vessel body 200a below the gasket engaging portion 217 is at least one detent element in the form of a bar protrusion 223c or 223d that also acts as the internal thread of vessel body 200a for engaging stopper 500b to seal the open end 201. While two detent elements 223c and 223d are shown, there can be more or less than two detent elements.

Stopper 500b is similar to stopper 500, except that it has a straw hole 529 for optional use with a straw (not shown) and utilizes a different detent engaging element as stoppers 500 and 500a. Below the plurality of holes 509 are external threads 511 on the depending wall 507 for engaging the vessel body 200a to seal the open end 201. An alternative to the tab 517a with through opening 519a of stopper 500 or the pair of raised bars 527 of stopper 500a, the detent engaging element of stopper 500b is at least one cantilever latch 531 along the external threads 511. Two or more cantilever latches 531 can be used. Each cantilever latch 531 has a pair of opposing levers 533a and 533b extending from a base 535. At each distal, free, end of the levers 533a and 533b, is a raised hook 537a and 537b. The distance between the corresponding raised hooks 537a and 537b is slightly bigger than the length of the bar protrusion 223c or 223d on the inner wall 209 of vessel body 200a so that the cantilever latch 531 can interact with the corresponding bar protrusion 223c or 223d when the stopper 500b is in an open position. Similar to the positioning of the detent elements that interact with the pair of raised bars 527 of stopper 500a, the positioning of the bar protrusions 223c and 223d on the inner wall 209 of the vessel body 200a for use with stopper 500b is closer to the top edge 205 than would be the detent elements for use with stopper 500 because the cantilever latches 531 are positioned along the external threads 511 instead of below the external threads 511 as for through opening 519a.

The rib 523a on the upper portion 501 of the stopper 500b is wider than the rib 523 of stoppers 500 and 500a. A straw hole 529 through the upper portion 501 is provided on a depressed portion 543 of the rib 523a. A straw (not shown) is insertable through the straw hole 529 to alternatively access the liquid in the vessel body 200a. A pivotable straw hole cover 539 carries a round plug 541 for selective sealing and resealing of the straw hole 529. When the straw hole cover 539 is in a closed position, with the plug 541 sealing the straw hole 529, the straw hole cover 539 is flushed with the upper surface of the rib 523a. This minimizes the risk of the straw hole cover 539 being accidentally pivoted to an open position while in transit, even if the vessel 10 is inside a bag with other loose items. The depressed portion 543 of the rib 523a allows easy access to the free end of the straw hole cover 539 to pivot it to an open position.

The use of the stopper 500b with vessel body 200a is similar to that for stopper 500a. After filling the vessel body 200a with liquid or a beverage, the stopper 500a is rotated in a clockwise direction, lowering the stopper 500b into and engaging the vessel body 200a. The stopper 500b is in the open position when the bar protrusion 223c is positioned between the corresponding hooks 537a and 537b of the cantilever latch 531. To position the stopper 500b in such an open position, sufficient force is required to rotate the stopper 500b such that the bar protrusion 223c can ride over one of the hooks 537a. The lever 533a flexes slightly when the bar protrusion 223c goes over the hook 537a. Tactile and/or audio feedback is provided from the bar protrusion 223c riding over the hook 537a to signal the appropriate positioning of the stopper 500b in the vessel body 200a in the open position. To position the stopper 500b into a closed position, the user can continue to rotate the stopper 500b in a clockwise direction. Some force is required for the bar protrusion 223c to ride over the other hook 537b. Once the bar protrusion 223c disengages and moves from between the hooks 537a and 537b, the stopper 500b is rotated until the gasket 700a interacts with the gasket engaging portion 217, with the enlarged, radially extending ledge 503 compressing the gasket 700a (specifically, the outer depending lip 703) against the gasket engaging portion 217 to create a water-tight seal to the open end 201 of the vessel body 200a. The reversed steps with the stopper 500b from a closed position to an open position is the same as for stopper 500a, which is simply a reversal of the steps from an open position to a closed position described above.

To alternatively access liquid or beverage in the vessel body 200a without rotating the stopper 500b, a user can pivot open the straw hole cover 539 and insert a straw through the straw hole 529. After use, the user can remove the straw from the straw hole 529, pivot the straw hole cover 539 to a closed position, with the plug 541 sealing straw hole 529 to provide a water tight seal.

Due to the locations and predetermined flow rate of the holes on the stopper through which liquid flows through, liquid would not splash onto the face of a user from over-flow or over-tilting of the vessel body, especially when the content is not visible to the user (such as with an opaque stopper and/or opaque vessel body).

Although the various embodiments of the travel vessels of the present invention described above utilize corresponding external and internal threads for interaction and engagement of the stopper with the vessel body, other types of removable attachments (e.g. bayonet type, etc.) known to one skilled in the art can be used. Similarly, different types of detent engaging elements and detent elements known to one skilled in the art can be used. The various detent engaging elements and detent elements described above can be used in connection with any of the stopper embodiment. To safely regulate the flow-rate and stream-shape of liquid dispensed from the vessel body, the holes from which liquid flow through the stopper only allow a certain flow rate of liquid, regardless of rotational positioning of the stopper between the open and closed positions (i.e. holes and flow rate are not regulated by unscrewing the stopper between the open and closed positions).

The features of the invention illustrated and described herein are the preferred embodiments. Therefore, it is understood that the specification is intended to cover unforeseeable embodiments with insubstantial differences that are within the spirit of the specification.

What we claim is:

1. A beverage container comprising:
   a vessel body having an open end and a closed end;
   a stopper for selective sealing of said open end of said vessel body in a closed, sealed, position and selective unsealing of said open end of said vessel body in an open, drinking, position; and
   a gasket on said stopper that, cooperatively with said stopper, seals said open end of said vessel body, said gasket having a first height;
   wherein said vessel body comprises:
      a substantially cylindrical body formed from an inner wall and an outer wall;
      a top edge at said open end adapted for drinking from said beverage container along all 360° of said top edge;
      a cup portion below said top edge formed from tapering of said inner wall towards a central longitudinal axis of said vessel body to form a radial extending lip;
      a gasket engaging portion below said cup portion formed from further tapering of said inner wall towards said central axis of said vessel body to form a radial extending rim;
      means for receiving and engaging said stopper to seal said open end below said gasket engaging portion; and
      at least one protrusion extending from said inner wall below said gasket engaging portion;
   wherein said stopper comprises:
      an upper portion with an enlarged, radially extending ledge and a lower surface;
      a lower portion with a tubular depending wall extending from said lower surface of said upper portion;
      a plurality of holes circumferentially disposed on said depending wall spaced apart from said lower surface of said upper portion wherein each of said holes having a height smaller than said first height of said gasket and is sized to provide flow of beverage at a predetermined, fixed, flow rate, regardless of said stopper's vertical position along said longitudinal axis, out of said vessel body along any of the 360° of said top edge when said stopper is in said open position, and said plurality of holes are completely above said receiving and engaging means of said vessel body when said stopper is in said open position;
      means for engaging said vessel body to seal said open end below said plurality of holes;
      at least one opening on said lower portion of said stopper for selective engagement with each of said protrusion of said vessel body within said opening when said stopper is in said open position; and
   wherein said gasket is on said stopper at a junction where said tubular depending wall extends from said lower surface of said upper portion, and is compressed between said enlarged, radially extending ledge of said stopper and said gasket engaging portion to provide a watertight seal of said open end of said vessel body when said stopper is in a closed position, and said plurality of holes are vertically spaced apart along said longitudinal axis from and below said gasket.

2. The beverage container of claim 1 wherein each of said plurality of holes has a perimeter, said depending wall has an outer surface and said outer surface is tapered towards and around the entire perimeter of each of said plurality of holes to promote a smooth flow of beverage through said holes.

3. The beverage container of claim 1 wherein said receiving and engaging means of said vessel body comprises internal threads and said engaging means of said stopper comprises corresponding external threads.

4. The beverage container of claim 1 wherein said depending wall of said stopper has a lower edge, said stopper further comprises:
   at least one tab extending from said lower edge of said depending wall; and
   each of said at least one opening on each of said at least one tab.

5. The beverage container of claim 4 wherein said at least one tab has an outer surface and further comprises:
   a pair of raised ramps on said outer surface of said at least one tab abutting said opening, each of said raised ramp having a tall end and a low end, with said tall end of each of said raised ramp abutting said opening.

6. The beverage container of claim 5 wherein said pair of raised ramps are asymmetrical in height, with one of said pair of raised ramps being higher than the other of said pair of raised ramps.

7. The beverage container of claim 3 wherein said at least one protrusion extending from said inner wall, and said at least one opening comprises:
at least a pair of raised bars along said external threads on said stopper for selective engagement of said protrusion on said inner wall of said vessel body between each pair of raised bars.

8. The beverage container of claim 3 wherein said at least one protrusion extending from said inner wall, and said at least one opening comprises:
at least one cantilever latch along said external threads on said stopper, each cantilever latch has a pair of opposing levers extending from a base, each distal, free, end of each lever has a raised hook for selective engagement of said bar protrusion on said inner wall of said vessel body between the raised hooks of said opposing levers of said cantilever latch.

9. The beverage container of claim 1 wherein said gasket comprises:
a ring shaped body;
an outer depending lip extending from said ring shaped body having said first height and a first diameter; and
an inner depending lip extending from said ring shaped body concentrically arranged with respect to said outer depending lip having a second height shorter than said first height and a second diameter smaller than said first diameter;
wherein said ring shaped body abuts said lower surface of said upper portion of said stopper, said inner depending lip abuts and surrounds said depending wall of said lower portion of said stopper, and said outer depending lip is compressed against said gasket engaging portion of said vessel body by said enlarged, radially extending ledge of said stopper to provide said watertight seal of said open end of said vessel body when said stopper is in said closed position.

10. The beverage container of claim 1 wherein said gasket comprises:
a ring shaped flange; and
an annular wall extending from said ring shaped flange;
wherein said ring shaped flange abuts said lower surface of said upper portion of said stopper, and said annular wall abuts and surrounds said depending wall of said lower portion of said stopper, and said ring shaped flange is compressed against said gasket engaging portion of said vessel body by said enlarged, radially extending ledge of said stopper to provide said watertight seal of said open end of said vessel body when said stopper is in said closed position;
wherein said stopper further comprises a plurality of large apertures circumferentially disposed on said depending wall; and
wherein each of said plurality of holes on said stopper is formed from said plurality of large apertures in cooperation with said annular wall of said gasket with said annular wall substantially, but not completely, covering each of said large aperture.

11. The beverage container of claim 1 wherein said gasket comprises:
a ring shaped flange; and
an annular wall extending from said ring shaped flange, said annular wall has a plurality of small apertures disposed circumferentially on said annular wall;
wherein said ring shaped flange abuts said lower surface of said upper portion of said stopper, and said annular wall abuts and surrounds said depending wall of said lower portion of said stopper, and said annular wall abuts and surrounds said depending wall of said lower portion of said stopper, and said ring shaped flange is compressed against said gasket engaging portion of said vessel body by said enlarged, radially extending ledge of said stopper to provide said watertight seal of said open end of said vessel body when said stopper is in said closed position;
wherein said stopper further comprises a plurality of large apertures circumferentially disposed on said depending wall; and
wherein each of said plurality of holes on said stopper is defined by said plurality of small apertures on said annular wall of said gasket overlapping and in cooperation with said large apertures with said annular wall completely covering said large apertures.

12. The beverage container of claim 1 wherein said gasket is made of a predetermined, fixed, highly contrasting color wherein when said stopper is in the open, drinking, position, said color is reflected off said cup portion of said vessel body to provide visual feedback of the open, drinking, position of said stopper.

13. The beverage container of claim 1 wherein said at least one protrusion and said at least one opening cooperatively, upon engagement, provide audio and tactile feedback indicating said stopper is in the open, drinking, position.

14. The beverage container of claim 1 wherein said upper portion of said stopper has a concave area with a rib spanning diametrically across said concave area dividing said concave area into two cavities.

15. The beverage container of claim 14 wherein said rib on said upper portion of said stopper has a depressed portion; said upper portion of said stopper has a straw hole in said depressed portion of said rib through said upper portion adapted to receive a straw insertable through said straw hole, and a straw hole cover pivotably connected to said rib having a plug for selective sealing and re-sealing of said straw hole, with said straw hole cover entirely positioned within said depressed portion when said straw hole cover is in a sealed position.

16. The beverage container of claim 1 wherein said substantially cylindrical body of said vessel body having an upper portion and a mid section.

17. The beverage container of claim 16 wherein said upper portion of said vessel body has a frusto-conical flare.

18. The beverage container of claim 16 wherein said vessel body further comprises a sleeve over said mid section of said vessel body.

19. The beverage container of claim 14 wherein said cup portion of said vessel body has indicia for indicating said stopper is in the open, drinking position, when said rib is in alignment with said indicia.

20. The beverage container of claim 1 wherein said vessel body is made of stainless steel.

* * * * *